(12) United States Patent
Frei et al.

(10) Patent No.: US 9,206,621 B2
(45) Date of Patent: Dec. 8, 2015

(54) TRACTOR CAB

(75) Inventors: Josef Frei, Marktoberdorf (DE); Johann Kloeck, Apfeltrang (DE); Andreas Stieglitz, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 14/129,312

(22) PCT Filed: Jun. 11, 2012

(86) PCT No.: PCT/EP2012/060972
§ 371 (c)(1),
(2), (4) Date: Jan. 24, 2014

(87) PCT Pub. No.: WO2013/000688
PCT Pub. Date: Jan. 3, 2013

(65) Prior Publication Data
US 2015/0008704 A1 Jan. 8, 2015

(30) Foreign Application Priority Data

Jun. 30, 2011 (GB) .................................. 1111190.3

(51) Int. Cl.
| | |
|---|---|
| *B60J 7/00* | (2006.01) |
| *E05B 15/02* | (2006.01) |
| *E05B 83/00* | (2014.01) |
| *E05B 85/04* | (2014.01) |
| *E05C 3/04* | (2006.01) |
| *B60H 1/24* | (2006.01) |

(Continued)

(52) U.S. Cl.
CPC ................ *E05B 15/022* (2013.01); *B60H 1/24* (2013.01); *B60J 1/14* (2013.01); *E05B 83/00* (2013.01); *E05B 83/42* (2013.01); *E05B 85/04* (2013.01); *E05C 3/043* (2013.01)

(58) Field of Classification Search
CPC .. B62D 33/0617; B62D 95/001; B62D 33/06; B62D 33/0604; B62D 29/043; B62D 25/10; Y10T 29/49622; E02F 9/163
USPC ................. 296/190.11, 146.1, 146.16, 146.9, 296/190.01, 190.08, 190.1, 191; 180/89.12
See application file for complete search history.

(56) References Cited

U.S. PATENT DOCUMENTS 3,954,292 A * 5/1976 Johnson .................... 292/169.17
4,756,178 A * 7/1988 Shen ............................... 70/380

(Continued)

FOREIGN PATENT DOCUMENTS

| DE | 387350 C | 12/1923 |
|---|---|---|
| DE | 1192549 B | 5/1965 |

(Continued)

OTHER PUBLICATIONS

International Search Report for International Application No. PCT/EP2012/060972 dated Oct. 11, 2012.

*Primary Examiner* — Kiran B Patel

(57) ABSTRACT

A tractor cab has an access door with an associated door latch to hold the door in a shut position and an openable panel such as a window which is secured in a closed position by a window latch mechanism which acts between the window and cab. The window latch mechanism includes resilient means which, when the window is secured in its closed position, allows the window to move outwardly relative to the cab when the door is slammed shut thus ensuring that the door latch can be engaged.

12 Claims, 6 Drawing Sheets

(51) Int. Cl.
  *B60J 1/14* (2006.01)
  *E05B 83/42* (2014.01)

(56) References Cited

U.S. PATENT DOCUMENTS

| | | | |
|---|---|---|---|
| 5,794,472 A * | 8/1998 | Kester et al. | 70/472 |
| 6,189,351 B1 * | 2/2001 | Eagan et al. | 70/472 |
| 6,398,274 B1 * | 6/2002 | Huang et al. | 292/358 |
| 6,626,018 B2 * | 9/2003 | Eller et al. | 70/224 |
| 6,840,071 B2 * | 1/2005 | Sedley | 70/276 |
| 6,860,129 B2 * | 3/2005 | Eller et al. | 70/217 |
| 7,055,873 B2 * | 6/2006 | Qing | 292/226 |
| 2003/0015363 A1 | 1/2003 | Aoyama et al. | |

FOREIGN PATENT DOCUMENTS

| | | |
|---|---|---|
| FR | 2701986 A1 | 9/1994 |
| FR | 2749874 A1 | 12/1997 |
| GB | 922303 A | 3/1963 |
| WO | WO-2010/039758 A2 | 4/2010 |

* cited by examiner

TRACTOR CAB

BACKGROUND OF THE INVENTION

This invention relates to tractor cabs.

Modern tractor cabs a very well sealed to exclude noise and pollution from the farming task being undertaken by the tractor. This leads to problems when the tractor cab door is slammed shut as the abrupt increase in air pressure in the cab caused by the slammed door may be sufficient to stop the door reaching its fully shut position.

Attempts have been made to overcome this problem by fitting one or more nozzles in the cab which allow the increased air pressure caused when the door is slammed to be discharge to the outside of the cab but these nozzles are problematical in that they must stop air/dust entering the cab and several nozzles may be required with the modern large cab doors which cause very high increases in cab internal pressure.

OVERVIEW OF THE INVENTION

It is an object of the present invention to provide a simple but effective solution to the above problem.

Thus according to the present invention there is provided a tractor cab having an access door with an associated door latch to hold the door in a shut position and an openable panel which is secured in a closed position by a panel latch mechanism which acts between the panel and cab, the panel latch mechanism including resilient means which, when the panel is secured in its closed position, allows the panel to move outwardly relative to the cab when the door is slammed shut thus ensuring that the door latch can be engaged.

This panel latch arrangement provides a simple but effective solution to the temporary rise in cab pressure when the door is slammed shut as the panel opens sufficiently, by compressing the resilient means, to vent the high increase in air pressure.

Although in the following description on the present invention the panel is described as being a window of the cab it will be understood that the panel could be a roof hatch or another door of the cab when the cab has two doors. The present invention also provides a panel latch mechanism for securing an opening tractor cab panel in a closed position relative to the cab, the latch mechanism including resilient means which, when the panel is secured in its closed position on the cab, allows the panel to move outwardly relative to the cab when a door of the cab is slammed shut thus ensuring that the door can reach its fully shut position.

The panel latch mechanism may include a spindle which is secured to the panel and a pivoting handle with a latching formation which is mounted on the spindle, the resilient means comprising a spring which surrounds the spindle and which when compressed allows the spindle and hence the panel to move outwardly relative to the handle.

The spindle and spring may be housed within the handle on the inside of the cab.

Alternatively, part of the spindle may be designed to extend outside the panel and the spring may be mounted on this external portion of the spindle.

In a further alternative construction, the spindle may extend within the handle and also outside the panel and springs may be provided both within the handle and also on the external portion of the spindle.

The spindle and spring may be housed within a tubular insert designed to fit into a bore in a standard panel handle.

In a further alternative construction the handle has a latching formation which engages a cooperating formation mounted on the cab to hold the panel in its closed position, the cooperating formation being resiliently mounted on the cab so that, when the door is slammed shut, the cooperating formation and hence the panel can move outwardly relative to the cab to allow the door to reach its fully shut position.

BRIEF DESCRIPTION OF THE DRAWINGS

The present invention will now be described with reference to the accompanying drawings in which.

DETAILED DESCRIPTION OF THE INVENTION

Figure 1:
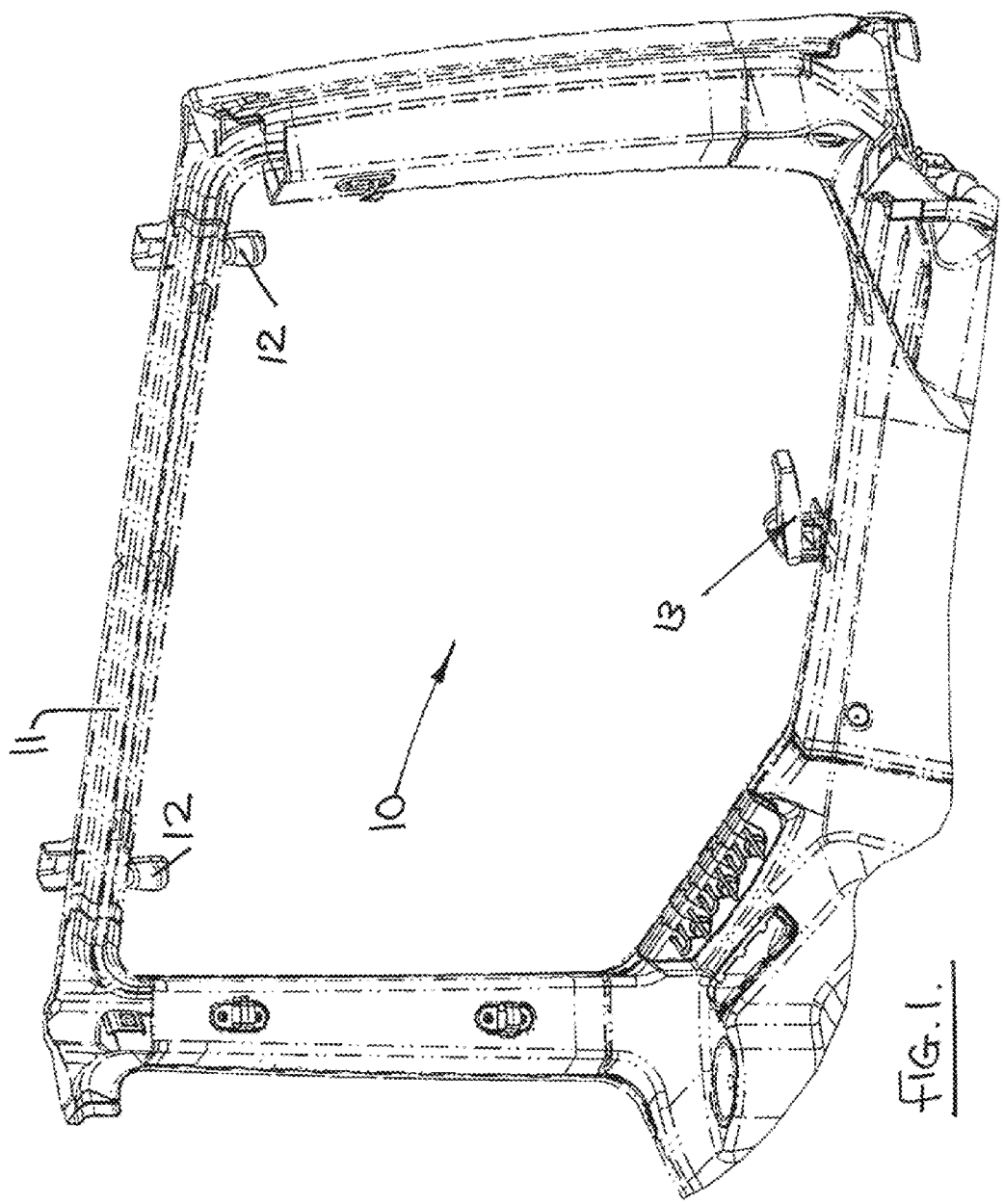
FIG. 1 shows a perspective view of a tractor cab rear window provided with a latching mechanism in accordance with the present invention.

Referring to the drawings, a tractor 5 has a cab 8 having an access door 7 with an associated door latch 6 to hold the door 7 in a shut position and an openable panel 9 which is secured in a closed position by a panel latch mechanism 13 which acts between the panel and cab, the panel latch mechanism 13 including resilient means which, when the panel is secured in its closed position, allows the panel 9 to move outwardly relative to the cab 8 when the door 7 is slammed shut thus ensuring that the door 7 can reach its fully shut position and the door latch 6 can be engaged. The openable panel 9 in the form of a rear window 10 is pivotally mounted at its upper edge on the cab 8 structure, part of which is shown at 11 in FIG. 1, on two hinges 12. The window is secured in its closed position by the latch mechanism 13 associated with the lower edge of the window 10. The window 10 is provided with a peripheral rubber seal 14 which is clamped against a window frame portion 15 of the cab 8 to seal the window 10 to the cab 8.

The latch mechanism 13 includes a handle 16 which has a latching formation 17 which engages a cooperating formation 18 which is rigidly secured to the tractor cab. Handle 16 is pivotally mounted on a spindle 19 which is secured to the window 10 by mounting washers 20 and nut 21 which engages a screw threaded end portion 22 of the spindle.

A resilient means in the form of a coil spring 23 surrounds spindle 19 within a bore 24 in the handle. Spring 23 is retained on spindle 19 by a washer 25 and screw 26. As is clear from FIG. 2, spring 23 biases a flange 27 on handle 16 against a shoulder 19b on spindle 19.

Figures 2, 3:
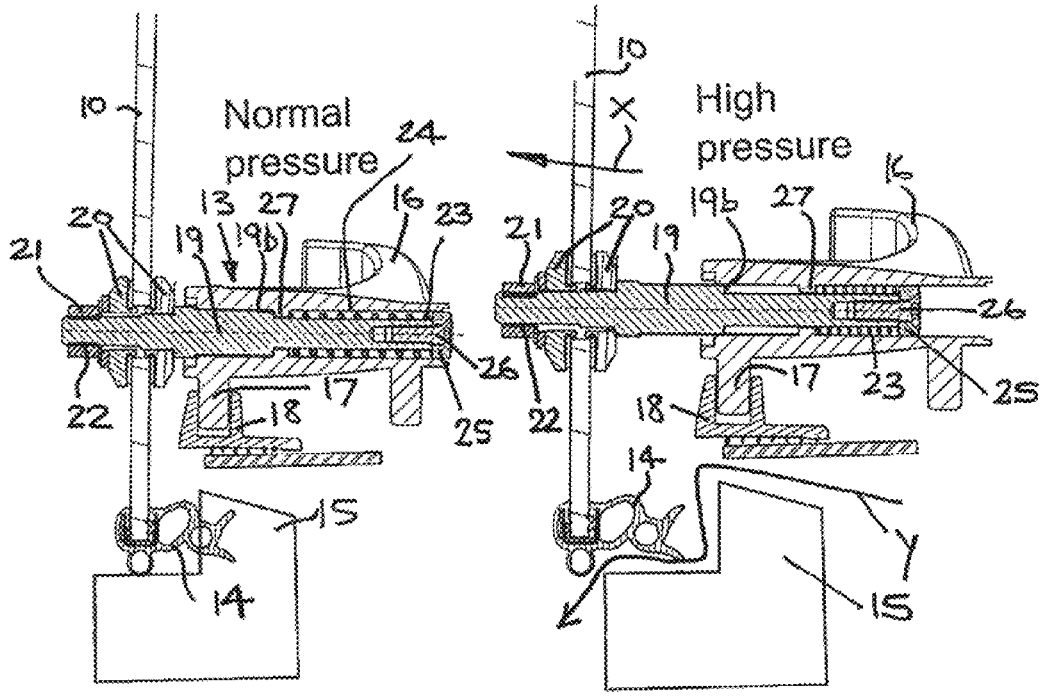
FIGS. 2 and 3 show cross sections through a first form of latching mechanism in accordance with the present invention in the normal closed position and a blown open position respectively.

When the window is secured in the normal closed position the various parts of the latch mechanism occupy the position shown in FIG. 2. In accordance with the present invention, if the door of the cab is slammed resulting in a high increase in cab internal pressure this increase in pressure allows the window 10 to move as indicated by the arrow X in FIG. 3 by compressing spring 23, as shown in FIG. 3. This allows seal 14 to be unseated from the frame portion 15 of the cab so that the excess pressure can escape from the cab as indicated by arrow Y in FIG. 3.

The above arrangement thus provides a simple but effective window latch mechanism which, at relatively low cost, allows any excess cab pressure caused by the cab door being slammed to be vented so that it is ensured that the cab door will reach its fully shut position and engage the associated cab door latch (not shown).

Figure 4:
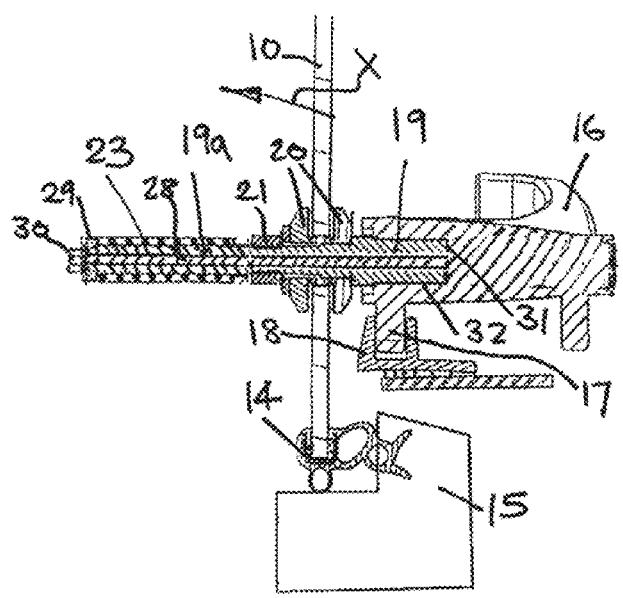
FIG. 4 shows a cross section through a second form of latching mechanism in accordance with the present invention in the normal closed position.

FIG. 4 shows a second form of latching mechanism in accordance with the present invention in which spindle 19 is slidably mounted on a rod 28 connected with handle 16. In this arrangement the coil spring 23 is mounted outside the cab window on an extension 19a of spindle 19 and is held captive between nut 21 and a washer 29 secured by a nut 30 on the end of rod 28. When the window is secured in its closed position as shown in FIG. 4, the spindle 19 is biased against the end 31 of a bore 32 in the handle 16 by the spring 23. If the cab pressure increases due to the slamming of the cab door, the window 10 is again allowed to move outwardly as indicated by arrow X in FIG. 4 with the spindle 19 moving along the rod 28 and thus compressing the external coil spring 23 between nut 21 and washer 29. This again allows the excess pressure to escape from the cab by a path Y similar to that shown in FIG. 3.

Figure 5:
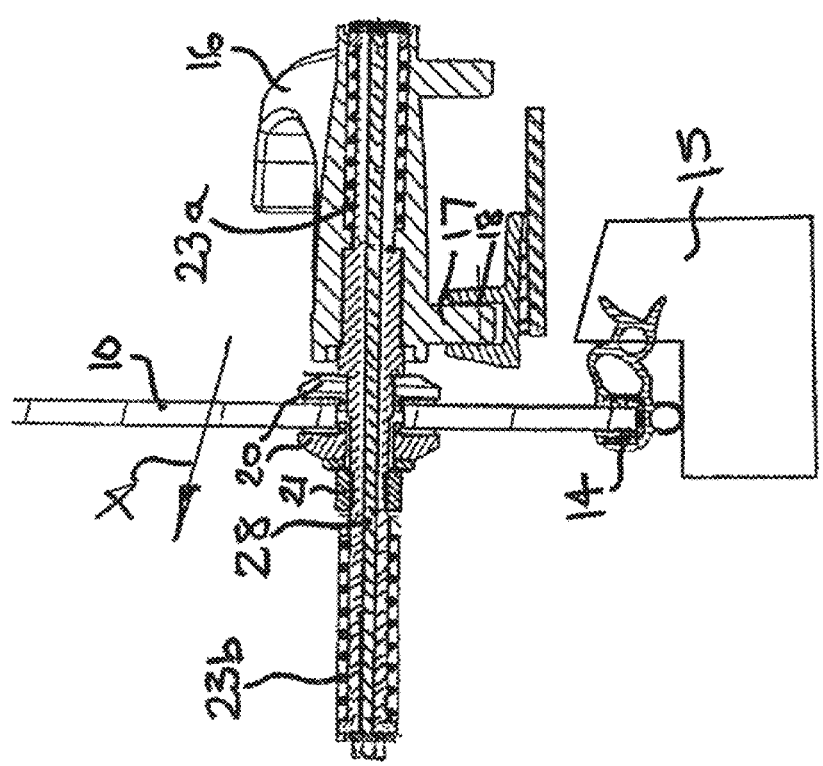
FIG. 5 shows a cross section through a third form of latching mechanism in accordance with the present invention in the normal closed position.

FIG. 5 shows a section through a third form of locking mechanism in which two coil springs 23a and 23b are provided one inside handle 16 and the other external to the window so that the resulting latch mechanism is in effect a combination of the arrangements shown in FIGS. 2 to 4 using a rod 28 which extends completely through spindle 19. Thus in this arrangement, when the associated cab door is slammed both the coil springs 23a and 23b are compressed as the window moves in the direction X.

Figure 6:
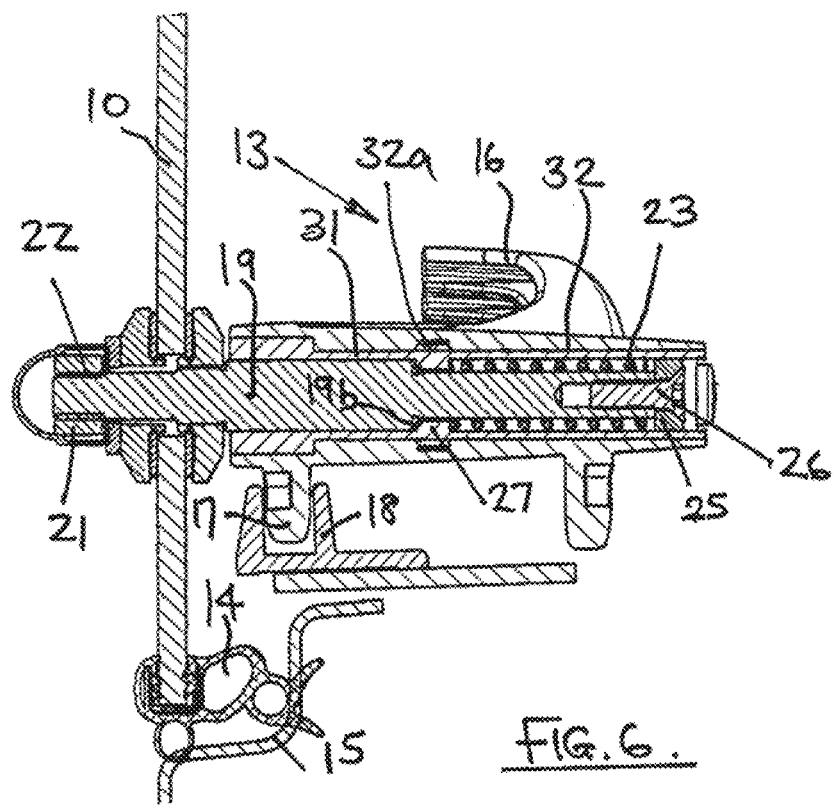
FIGS. 6 and 7 show cross sections through a fourth form of latching mechanism in accordance with the present invention in the normal closed position and a blown open position respectively.
Figure 7:
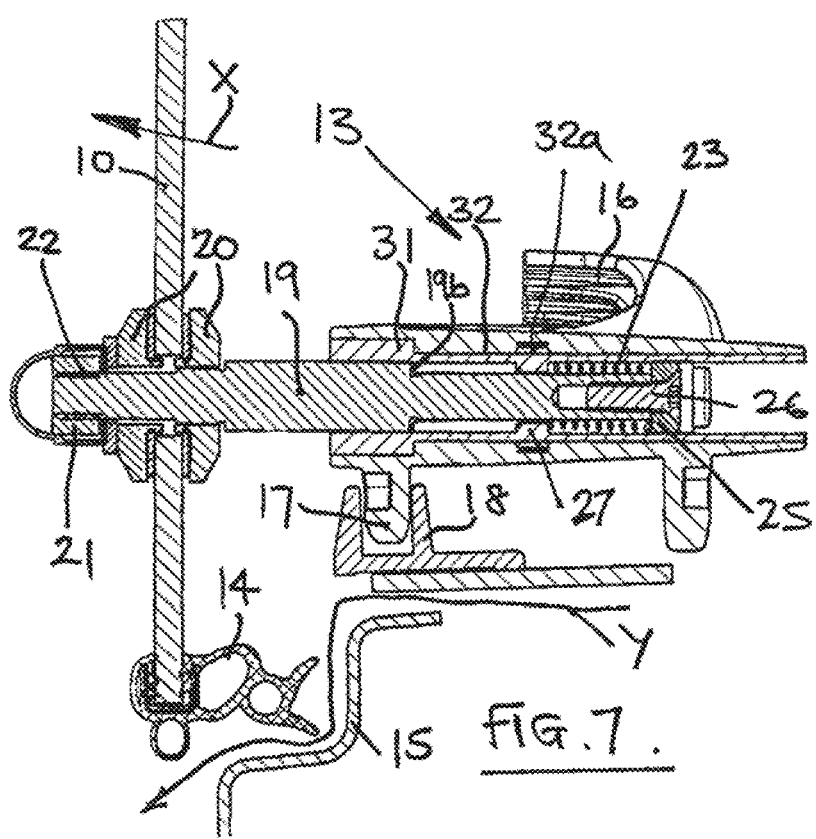

FIGS. 6 and 7 show a yet further form of latching mechanism in accordance with the present invention which is basically similar to that shown in FIGS. 2 and 3 with the exception that the spindle 19 and associated coil spring 23 etc are housed within a bushing 31 which is held in a bore 32 in handle 16 by a gripping member 32a. This arrangement thus enables a standard window latching mechanism to be easily adapted to include the present invention using the bushing 31.

Figure 8:
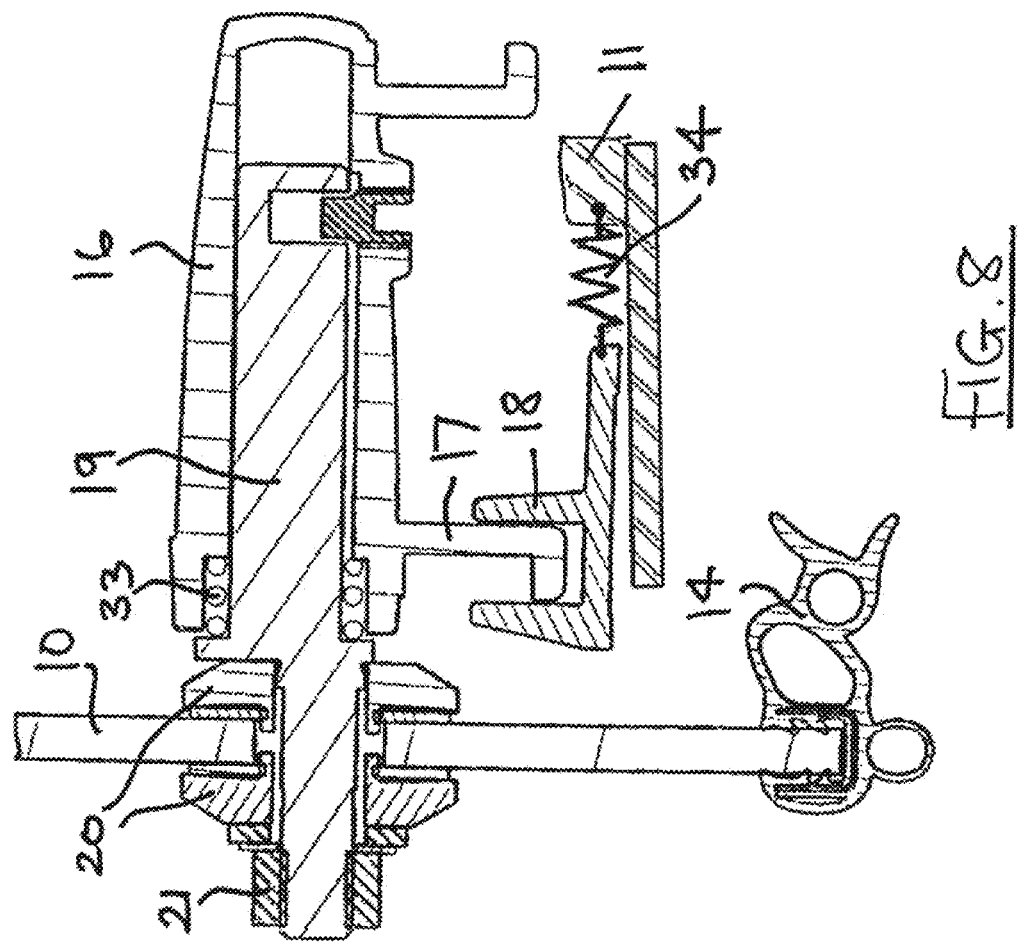
FIG. 8 shows diagrammatically a fifth form of latching mechanism in accordance with the present invention in the normal closed position.

FIG. 8 shows a still further form of latching mechanism in accordance with the present invention in which the handle 16 rotates on the spindle 19 which includes a small coil spring 33 which provides some resilience between the latching formation 17 on the handle and the cooperating formation 28 on the tractor cab. This spring is thus slightly compressed when the handle 16 is rotated to engage the latching formation 17 in the cooperating formation 18 in order to ensure that the seal 14 is biased against the cooperating frame portion 15 of the cab which is not shown in FIG. 8.

In the embodiment shown in FIG. 8, the movement of the window 10 in the direction X is permitted by the resilient mounting of the cooperating formation 18 on the cab via a spring 34 which is shown diagrammatically in FIG. 8.

Thus when the associated cab door is slammed the window moves in direction X and either extends or compresses the spring 34 depending on how the spring is fitted relative to the cab on which the formation 18 mounted.

Figure 9:
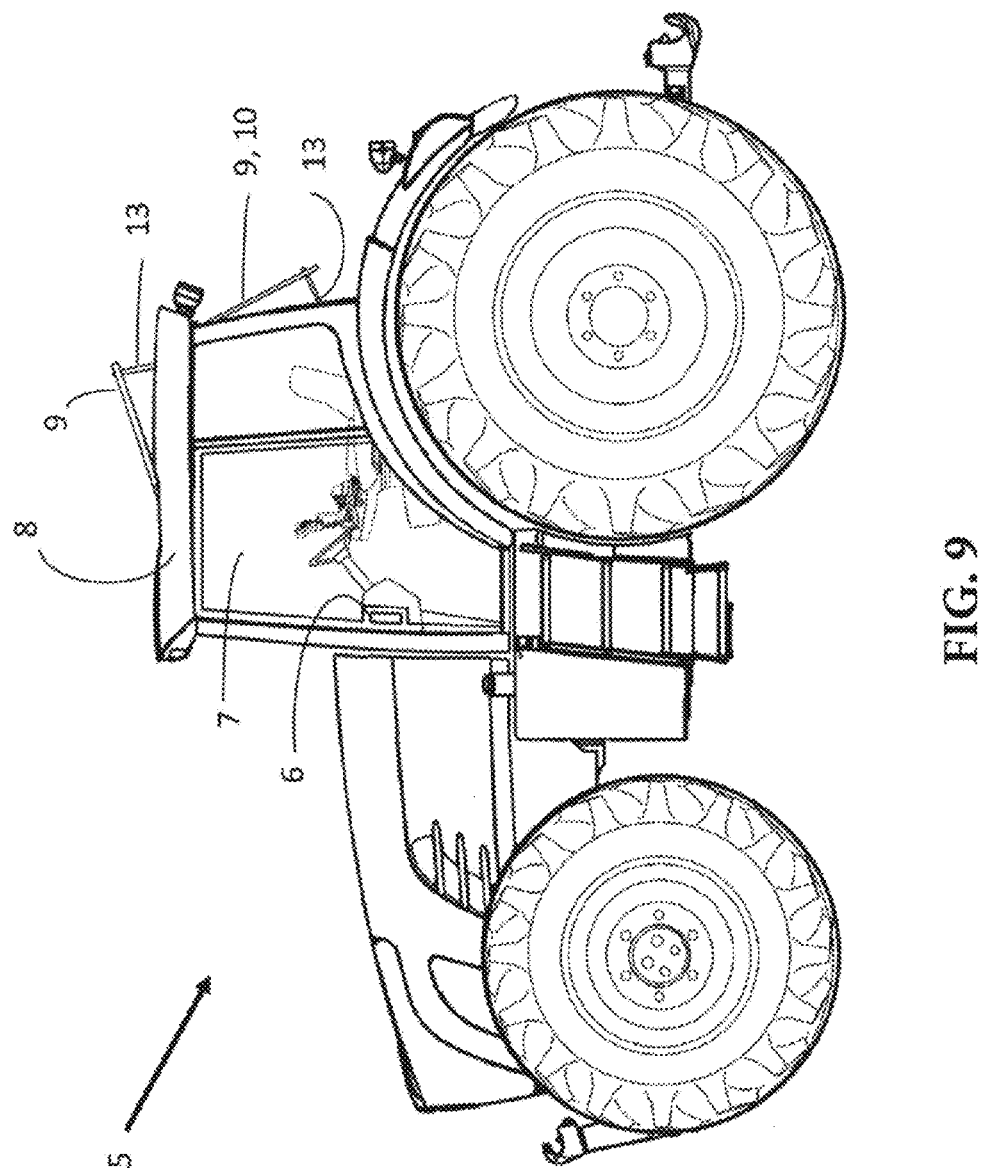
FIG. 9 is a side elevational view of a tractor having a tractor cab in accordance with the present invention.

All the various forms of the present invention described above thus offer simple arrangements which allow an openable panel in the form of a cab window to open slightly when the associated cab door is slammed thus venting the high rise in cab pressure which will be caused and thus ensuring that the cab door can reach its fully closed position and engage the associated door latch. As referred to above, although the present invention has been described in relation to an opening panel 9 in the form of a cab window 10, it will be understood that the opening panel 9 could be, for example, a roof hatch as shown in FIG. 9 or another door 7 of the cab 8 when the cab has two doors.

The invention claimed is:

1. A tractor cab having an access door with an associated door latch to hold the door in a shut position and an openable panel which is secured in a closed position by a panel latch mechanism which acts between the panel and cab, the panel latch mechanism including resilient means which, when the panel is secured in its closed position, allows the panel to move outwardly relative to the cab when the door is slammed shut thus ensuring that the door can reach its fully shut position and the door latch can be engaged.

2. A tractor cab according to claim 1 in which a spindle is secured to the panel and a pivoting handle with a latching formation is mounted on the spindle, the resilient means comprising a spring which surrounds the spindle and which when compressed allows the spindle and hence the panel to move outwardly relative to the handle.

3. A tractor cab according to claim 2 in which the spindle and spring are housed within the handle on the inside of the cab.

4. A tractor cab according to claim 2 in which part of the spindle is designed to extend outside the panel and the spring is mounted on this external portion of the spindle.

5. A tractor cab according to claim 2 in which the spindle extends within the handle and also outside the panel and springs are provided both within the handle and also on the external portion of the spindle.

6. A tractor cab according to claim 2 in which the spindle and spring is housed within a tubular insert designed to fit into a bore in a standard panel handle.

7. A tractor cab according to claim 1 in which the handle has a latching formation which engages a cooperating formation mounted on the cab to hold the panel in its closed position, the cooperating formation being resiliently mounted on the cab so that, when the door is slammed shut, the cooperating formation and hence the panel can move outwardly relative to the cab to allow the door to reach its fully shut position.

8. A tractor cab according to claim 1 in which the panel is a window of the cab.

9. A tractor cab according to claim 1 in which the panel is a roof hatch of the cab.

10. A tractor cab according to claim 1 having two doors in which the panel is the other door of the cab.

11. A tractor cab according to claim 3 in which the spindle extends within the handle and also outside the panel and springs are provided both within the handle and also on the external portion of the spindle.

12. A tractor cab according to claim 4 in which the spindle and spring is housed within a tubular insert designed to fit into a bore in a standard panel handle.

* * * * *